US009694294B1

(12) United States Patent
Petrov

(10) Patent No.: US 9,694,294 B1
(45) Date of Patent: Jul. 4, 2017

(54) NAVIGATION CONTROLLER FOR VIRTUAL-REALITY SYSTEMS

(71) Applicant: OCULUS VR, LLC, Menlo Park, CA (US)

(72) Inventor: Yury Anatolievich Petrov, Half Moon Bay, CA (US)

(73) Assignee: OCULUS VR, LLC, Menlo Park, CA (US)

( * ) Notice: Subject to any disclaimer, the term of this patent is extended or adjusted under 35 U.S.C. 154(b) by 0 days.

(21) Appl. No.: 14/985,806

(22) Filed: Dec. 31, 2015

(51) Int. Cl.
| A63G 31/16 | (2006.01) |
| A47C 7/40 | (2006.01) |
| A47C 7/38 | (2006.01) |
| A47C 3/18 | (2006.01) |
| A47C 7/56 | (2006.01) |
| A47C 7/58 | (2006.01) |
| A47C 7/60 | (2006.01) |
| G09B 9/02 | (2006.01) |
| A63G 31/02 | (2006.01) |
| A63F 13/24 | (2014.01) |
| A47C 7/72 | (2006.01) |

(52) U.S. Cl.
CPC .............. *A63G 31/16* (2013.01); *A47C 3/18* (2013.01); *A47C 7/38* (2013.01); *A47C 7/40* (2013.01); *A47C 7/563* (2013.01); *A47C 7/58* (2013.01); *A47C 7/60* (2013.01); *A63F 13/24* (2014.09); *A63G 31/02* (2013.01); *G09B 9/02* (2013.01); *A63F 2300/8082* (2013.01)

(58) Field of Classification Search
CPC ........ A63G 31/00; A63G 31/12; A63G 31/16; A47C 3/00; A47C 3/0257; A47C 7/72; A47C 15/00; A47C 15/004; A47C 21/00; A47B 21/00
USPC ........ 472/59, 60, 61, 130; 297/261.1, 302.1, 297/317, 322, 325, 341, 217.2, 217.3
See application file for complete search history.

(56) References Cited

U.S. PATENT DOCUMENTS

| 160,624 | A | * | 3/1875 | Spencer | ................ | B60N 2/045 |
| | | | | | | 248/395 |
| 4,915,450 | A | * | 4/1990 | Cooper | ................ | F16M 11/10 |
| | | | | | | 248/919 |
| 5,695,406 | A | * | 12/1997 | Park | ................ | A47C 7/72 |
| | | | | | | 434/55 |
| 6,733,293 | B2 | * | 5/2004 | Baker | ................ | G09B 19/16 |
| | | | | | | 434/55 |

(Continued)

*Primary Examiner* — Kien Nguyen
(74) *Attorney, Agent, or Firm* — Morgan, Lewis & Bockius LLP

(57) ABSTRACT

A virtual-reality navigation controller includes a base and a seating portion. The seating portion includes a seat for supporting a weight of a user seated thereon and a back-rest coupled to the seat to move integrally with the seat and to support the user's back. The virtual-reality navigation controller further includes a vertical support to support the seating portion on the base, and a rotatable connector between the seating portion and the vertical support to tilt the seating portion about a rotational center of the rotatable connector when the user is seated on the seat. A radius of an arc formed by the tilting about the rotational center ranges from 300 mm to 800 mm. The virtual-reality navigation controller further includes a motion-detection controller to measure pitch corresponding to the tilt of the seating portion.

20 Claims, 6 Drawing Sheets

(56) References Cited

U.S. PATENT DOCUMENTS

| | | | |
|---|---|---|---|
| 7,662,042 B2 * | 2/2010 | Oswald | A47C 15/004 434/29 |
| 8,141,949 B2 * | 3/2012 | Baru | A47B 21/00 297/172 |
| 2011/0031788 A1 * | 2/2011 | Kosik | A47C 3/0257 297/217.3 |

* cited by examiner

NAVIGATION CONTROLLER FOR VIRTUAL-REALITY SYSTEMS

TECHNICAL FIELD

This disclosure relates generally to gaming entertainment and virtual-reality systems, and more specifically to a navigation controller for simulation of pitch and/or yaw motion for use in such gaming entertainment and virtual-reality systems while providing vestibular (balance), somatosensory (skin), and proprioceptive (muscle) sensations to accompany the visually experienced acceleration in real life and prevent simulator (motion) sickness.

BACKGROUND

Virtual-reality simulation systems are becoming increasingly popular for applications such as video gaming and operator skill and developmental training. Such virtual-reality simulation systems are generally designed to mimic an object environment for a targeted application. For example, video simulators have been proposed for simulating the dynamics of aircraft, marine vessels, locomotives and automobiles. In each of these examples, the objective of the video simulation system is to mimic visual and motion characteristics of an environment associated with operation of the object under simulated conditions.

It is important to accurately simulate the dynamics of an object environment, especially where the associated application is training, for example flight operator training. The operator's experience within the simulator should closely resemble real-world conditions in order to build adequate experience, skill and to anticipate reactions of the operator in preparation for a real-world event or condition.

Currently available systems have yet to provide a cost-effective and adequate motion simulation platform. To be cost effective, it would be beneficial to provide such a platform with relatively few moving components and a reasonable size. There is a need in the art to overcome the challenges of providing fewer mechanical parts while maintaining adequate motion simulation. Thus, there is an ongoing need for improved motion platforms for use with video virtual-reality simulation systems, especially such platforms configured for low cost, simple and effective mechanical motion simulation.

SUMMARY

Disclosed motion simulation provides vestibular (balance), somatosensory (skin) and proprioceptive (muscle) sensations or stimulation during active (self-initiated) virtual-reality navigation, which accompanies visually experienced sensations in reality. For example, yaw motion about a vertical axis and pitch motion corresponding to tilting of the navigation controller are used to simulate motion with acceleration in virtual-reality, while providing appropriate vestibular (balance), proprioceptive (muscle) and somatosensory (skin) stimulation to accompany the visually experienced acceleration and prevent simulator sickness, which is similar to motion sickness.

In accordance with some embodiments, a virtual-reality navigation controller includes a base and a seating portion. The seating portion includes a seat for supporting a weight of a user seated thereon and a back-rest coupled to the seat to move integrally with the seat and to support the user's back. The virtual-reality navigation controller further includes a vertical support to support the seating portion on the base, and a rotatable connector between the seating portion and the vertical support to yaw and tilt the seating portion about a rotational center of the rotatable connector, when the user is seated on the seat. A radius of an arc formed by the tilting about the rotational center ranges from 300 mm to 800 mm. The virtual-reality navigation controller further includes a motion-detection controller to measure yaw, pitch, and/or vertical displacement of the seating portion.

In some embodiments, the seat extends lengthwise along a horizontal axis from a proximal end to a distal end. At least a portion of a length of the seat on both left and right sides is concavely curved toward a center axis along the length of the seat to narrow the seat toward the distal end and to accommodate legs of the user (e.g., during yaw, tilt, and/or vertical chair movements).

In some embodiments, the motion-detection controller is communicatively coupleable to a virtual-reality device to initiate corresponding tilting motions in virtual-reality.

In some embodiments, the motion-detection controller is to measure yaw corresponding to rotation of the seating portion about a vertical axis of the vertical support.

In some embodiments, the rotatable connector includes a first pair of parallel rails coupled to the seating portion, and a second pair of parallel rails coupled to the first pair of parallel rails. Each rail of the second pair of parallel rails has a C-shaped curved profile. The rotatable connector further includes a roller portion including a plurality of rollers rollably disposed along the curved profile of each rail of the second pair of rails. The roller portion is coupled to the vertical support.

In some embodiments, the second pair of parallel rails is slidably engaged with the plurality of rollers. The plurality of rollers is secured within the second pair of parallel rails to slidably tilt the seating portion along the circumferences of the second pair of parallel rails.

In some embodiments, the plurality of rollers comprises a first pair of rollers slidably engaged in a first rail of the second pair of parallel rails and a second pair of rollers slidably engaged in a second rail of the second pair of parallel rails.

In some embodiments, a radius of an upward arc of each rail of the second pair of parallel rails is approximately 700 mm to prevent counter-phase movement of the user's head in relation to the movement of the seating portion.

In some embodiments, each rail of the second pair of parallel rails includes a dip at a bottom portion of the C-shape curved profile. In a non-tilted position of the seating portion, respective rollers of the plurality of rollers are disposed in a resting position in the dips.

In some embodiments, the respective rollers are configured to be shifted out of the dips from the resting position to a tilting position when the user exerts at least one of a backward pushing force or a forward pulling force on the seating portion. The plurality of rollers is configured to be returned to the resting position naturally by a weight of the user sitting on the seating portion when the user ceases to apply the at least one of the pushing or pulling force.

In some embodiments, the backward pushing force is a force exerted by the user pushing backwards with feet resting on the floor while sitting in the seating portion. The forward pulling force is a force exerted by the user pulling forward with feet resting on the floor while sitting in the seating portion.

In some embodiments, a maximum tilting displacement due to at least one of a backward tilt and a forward tilt of the seating portion based on a circumference of each rail of the second pair of parallel rails measured from a center of the bottom portion of each rail of the second pair of parallel rails in the corresponding backwards or forward direction is approximately 300 mm.

In some embodiments, the virtual-reality navigation controller further includes a counterbalance weight to facilitate tilting of the seating portion backward by exerting a downward force on a back portion of the first and second pairs of parallel rails.

In some embodiments, the radius of the arc formed by the tilting about the rotational center of the rotatable connector ranges from 500 mm to 700 mm.

In some embodiments, the seating portion is rotatably coupled to the vertical support to be rotatable about a vertical axis of the vertical support. The motion-detection controller is configured to measure a degree of the rotation (i.e., a degree of yaw) and communicate the degree of the rotation to a virtual-reality device to initiate corresponding rotation in virtual-reality.

In some embodiments, the motion-detection controller is coupled to the seating portion.

In some embodiments, the virtual-reality navigation controller further includes a head-rest configured to support a head of the user seated in the seating portion and coupled to the back-rest. The rotatable connector is configured to tilt the seating portion about an axis of the head-rest at a point located near the user's head when the user is seated on the seat. The motion-detection controller is coupled to the head-rest.

In some embodiments, the base includes wheels which are configurable to be locked during tilting of the seating portion and freely rotatable when the seating portion is configured for use as a chair during non-virtual-reality activities. The rotatable connector is configured to lock the seating portion into a desired configuration for use as a chair during the non-virtual-reality activities.

In accordance with some embodiments, a virtual-reality navigation controller includes a base and a seating portion. The seating portion includes a seat for supporting a weight of a user seated thereon and a back-rest coupled to the seat to move integrally with the seat and to support the user's back. The virtual-reality navigation controller further includes a vertical support to support the seating portion on the base, and a rotatable connector. The rotation displacement connector includes a first pair of parallel rails coupled to the seating portion, a second pair of parallel rails coupled to the first pair of parallel rails, each rail of the second pair of parallel rails having a C-shape curved profile, and a plurality of rollers rollably disposed along the curved profile of each rail of the second pair of rails. The rotatable connector is configured to tilt the seating portion about a rotational center of the rotatable connector when the user is seated on the seat. A radius of an upward arc of each rail of the second pair of parallel rails based on the rotational center ranges from 300 mm to 800 mm, to prevent counter-phase movement of the user's head in relation to the movement of the seating portion. The virtual-reality navigation controller further includes a motion-detection controller to measure yaw corresponding to rotation of the seating portion about a vertical axis of the vertical support and to measure pitch corresponding to the tilt of the seating portion.

In some embodiments, the second pair of parallel rails is slidably engaged with the plurality of rollers. The plurality of rollers is secured within the second pair of parallel rails to slidably tilt the seating portion along the circumference of the second pair of parallel rails. Each rail of the second pair of parallel rails includes a dip at a bottom portion of the C-shape curved profile. In a non-tilted position of the seating portion, respective rollers of the plurality of rollers are disposed in a resting position in the dips.

Various advantages of the present application are apparent in light of the descriptions below.

Embodiments disclosed in the attached claims directed to a virtual-reality navigation controller. The dependencies or references back in the attached claims are chosen for formal reasons only. However, any subject-matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combination of features as set out in the attached claims, but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

In some embodiments, a virtual-reality navigation controller comprises:
  a base;
  a seating portion, including:
  a seat for supporting a weight of a user seated thereon, and
  a back-rest coupled to the seat to move integrally with the seat and to support the user's back;
  a support to support the seating portion on the base;
  a rotatable connector between the seating portion and the support to tilt the seating portion about a rotational center of the rotatable connector when the user is seated on the seat, wherein a radius of an arc formed by the tilting about the rotational center ranges from 300 mm to 800 mm; and
  a motion-detection controller to measure pitch corresponding to the tilt of the seating portion.

Herein, the arc referred to may be an arc described by the seat. The support may form a vertical support in use. Tilt may be with respect to an axis that is, in use, oriented essentially vertically, e.g. an essentially vertical axis defined by the support when the base is placed on a generally horizontal support surface such as a floor. The rotatable connector may be arranged to guide movement of the seating portion with respect to the support and the base, such as to allow horizontal and vertical displacement in use, i.e. with the base placed on a generally horizontal support surface such as a floor. The tilt may then be due to vertical and horizontal displacement of the seating portion.

The seat may extend lengthwise along an, in use, essentially horizontal axis from a proximal end to a distal end, at least a portion of a length of the seat on both left and right sides being concavely curved toward a center axis along the length of the seat to narrow the seat toward the distal end and to accommodate legs of the user during chair movements; and/or the motion-detection controller may be communicatively coupleable or coupled to a virtual-reality device, e.g. a virtual-reality device including at least one display device and/or a virtual-reality device mountable to a user's head, configured to initiate corresponding tilting motions in virtual reality, e.g. as rendered by the virtual-reality device.

The motion-detection controller may be configured to measure yaw corresponding to rotation of the seating portion about an axis of the support, e.g. an in use essentially vertical axis of the support.

The rotatable connector may comprise:

a first pair of parallel rails coupled to the seating portion;

a second pair of parallel rails coupled to the first pair of parallel rails, each rail of the second pair of parallel rails having a C-shaped curved profile; and a plurality of rollers rollably disposed along the curved profile of each rail of the second pair of rails, wherein, optionally, the plurality of rollers may be included in a roller portion coupled to the support.

In some embodiments, the arc may correspond to an upward arc of each rail of the second pair of parallel rails based on the rotational center and ranges from 300 mm to 800 mm, to prevent counter-phase movement of the user's head in relation to the movement of the seating portion.

The second pair of parallel rails may be slidably engaged with the plurality of rollers; and the plurality of rollers secured within the second pair of parallel rails to slidably tilt the seating portion along the circumferences of the second pair of parallel rails.

The plurality of rollers may comprise a first pair of rollers slidably engaged in a first rail of the second pair of parallel rails and a second pair of rollers slidably engaged in a second rail of the second pair of parallel rails.

A radius of an upward arc of each rail of the second pair of parallel rails may be approximately 700 mm to prevent counter-phase movement of the user's head in relation to the movement of the seating portion.

Each rail of the second pair of parallel rails may comprise a dip at a bottom portion of the C-shape curved profile; and in a non-tilted position of the seating portion, respective rollers of the plurality of rollers may be disposed in a resting position in the dips.

The respective rollers may be configured to be shifted out of the dips from the resting position to a tilting position when the user exerts at least one of a backward pushing force or a forward pulling force on the seating portion; and the plurality of rollers may be configured to be returned to the resting position naturally by a weight of the user sitting on the seating portion when the user ceases to apply the at least one of the pushing or pulling force.

The backward pushing force may comprise a force exerted by the user pushing backwards with feet resting on the floor while sitting in the seating portion; and the forward pulling force may comprise a force exerted by the user pulling forward with feet resting on the floor while sitting in the seating portion, wherein, optionally, a maximum tilting displacement due to at least one of a backward tilt and a forward tilt of the seating portion based on a circumference of each rail of the second pair of parallel rails measured from a center of the bottom portion of each rail of the second pair of parallel rails in the corresponding backwards or forward direction may be approximately 300 mm.

Some embodiments may further comprise a counterbalance weight to facilitate tilting of the seating portion backward by exerting a downward force on a back portion of the first and second pairs of parallel rails.

The radius of the arc formed by the tilting about the rotational center of the rotatable connector may range from 500 mm to 700 mm; and/or the seating portion may be rotatably coupled to the support to be rotatable about an axis of the support, e.g. an in use vertical axis of the support, and the motion-detection controller configured to measure a degree of the rotation and communicate the degree of the rotation to a virtual-reality device to initiate corresponding rotation in virtual-reality; and/or the motion-detection controller may be coupled to the seating portion.

Some embodiments may further comprise a head-rest configured to support a head of the user seated in the seating portion and coupled to the back-rest, wherein the rotatable connector may be configured to tilt the seating portion about an axis of the head-rest at a point located near the user's head when the user is seated on the seat, and the motion-detection controller coupled to the head-rest.

The base may comprise wheels which are configurable to be locked during tilting of the seating portion and freely rotatable when the seating portion is configured for use as a chair during non-virtual-reality activities; and the rotatable connector may be configured to lock the seating portion into a desired configuration for use as a chair during the non-virtual-reality activities.

BRIEF DESCRIPTION OF THE DRAWINGS

For a better understanding of the various described embodiments, reference should be made to the Detailed Description below, in conjunction with the following drawings. Like reference numerals refer to corresponding parts throughout the figures and description.

DETAILED DESCRIPTION

Figure 1:
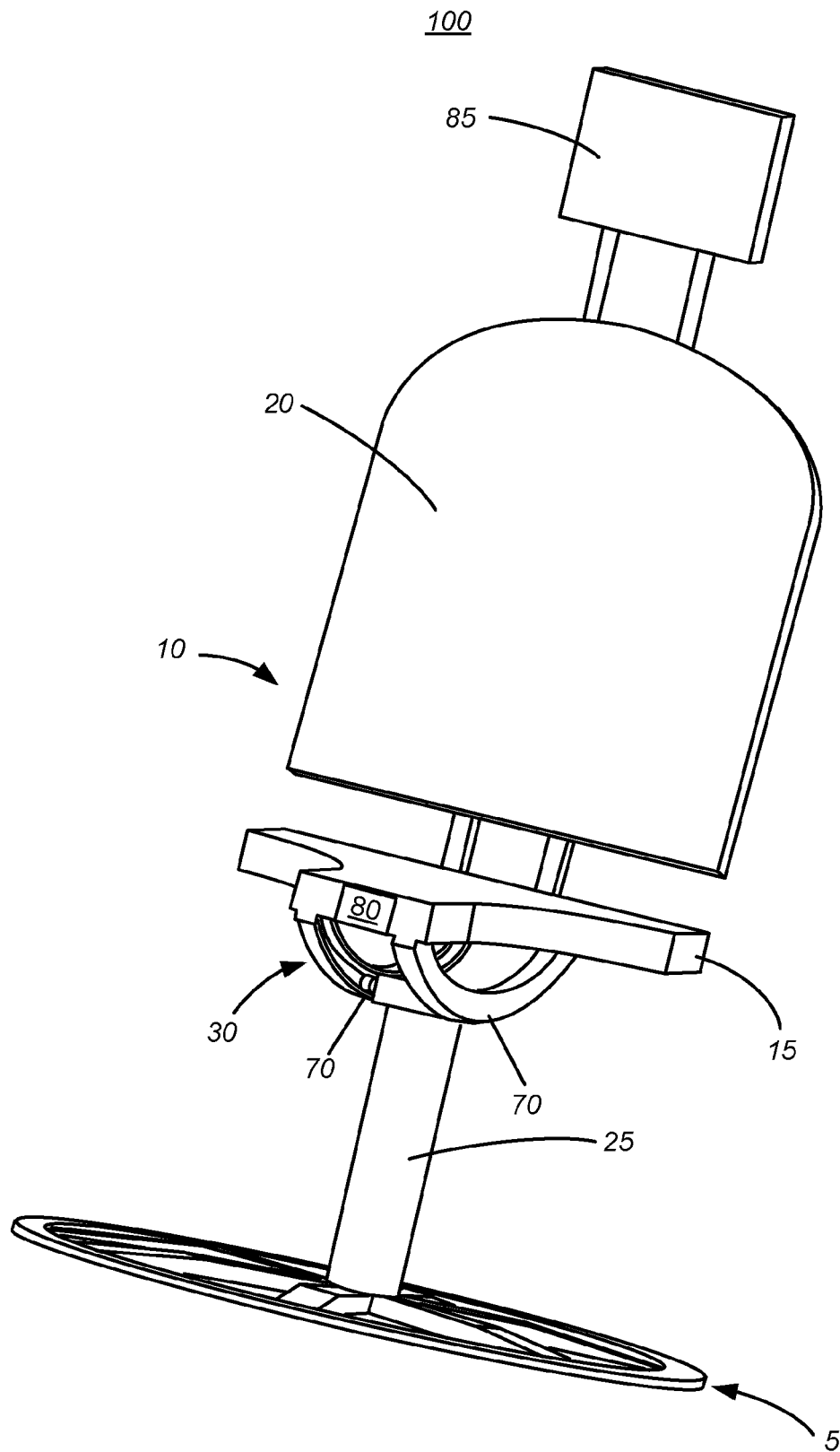
FIG. 1 illustrates a front perspective view of a virtual-reality navigation controller in accordance with some embodiments.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known systems, methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first pair could be termed a second pair, and, similarly, a second pair could be termed a first pair, without departing from the scope of the various described embodiments. The first pair and the second pair are both pairs, but they are not the same pair.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Virtual-reality systems may generally include expensive motion platforms to provide the missing vestibular stimulation in their virtual-reality simulators. Navigating an immersive virtual-reality environment can cause an unpleasant sensation termed simulator sickness. Simulator sickness experience is similar to motion sickness and is very common in virtual-reality scenarios involving various accelerations, including stops, turns, rotations, sways, and jumps. Simulator sickness is a serious hurdle for the future of the virtual-reality industry, because these navigation scenarios are unavoidable in virtual-reality systems aiming to provide immersive and real-feeling virtual-reality environments. The main cause of the simulator sickness is the lack of vestibular (balance) sensation, which generally accompanies visually experienced acceleration in real life.

Typical motion platforms used with virtual-reality systems present the problem of providing insufficient vestibular (balance), proprioceptive (muscle), and somatosensory (skin) sensation or stimulation for the user to match the visualized motion in virtual-reality, thereby making the user more prone to simulator sickness. The large size and expense of typical motion platforms also makes them impractical in many applications.

Accordingly, the present disclosure describes virtual-reality navigation controllers capable of providing the necessary vestibular (balance) sensation or stimulation during active (self-initiated) virtual-reality navigation, which accompanies visually experienced sensations in reality. The disclosed virtual-reality navigation controllers have a practical size and a reasonable cost, because they are shaped and sized as a chair.

FIG. 1 illustrates a perspective view of a virtual-reality navigation controller 100 in accordance with some embodiments. The virtual-reality navigation controller 100 includes a base 5 and a seating portion 10. The seating portion 10 includes a seat 15 for supporting a weight of a user seated thereon, and a back-rest 20 coupled to the seat 15 to move integrally with the seat 15 and to support the user's back when seated on the seat 15. The navigation controller 100 further includes a vertical support 25 to support the seating portion 10 on the base 5, and a rotatable connector 30 between the seating portion 10 and the vertical support 25 to tilt the seating portion 10 about a rotational center of the rotatable connector 30 when the user is seated on the seat 15. The tilting occurs about a point (i.e., an axis) located in or adjacent to the user's head. A radius of an arc formed by the tilting about the rotational center ranges from 300 mm to 800 mm, or from 500 mm to 700 mm, or approximately 600 mm, or approximately 700 mm. By approximately, it is intended that the radius of the upwards arc be within 2% of the stated value. The aforementioned configuration provides the advantage of preventing an undesirable vestibular signal counter to the simulated motion (e.g. acceleration, or deceleration) in virtual-reality. The prevention of the undesirable vestibular (balance) signal is achieved by providing the radius of the arc at a measurement equaling or exceeding the distance between the seat 15 and head center of an average height seated user. Though recited in terms of certain ranges, it will be understood that all ranges from the lowest of the lower limits to the highest of the upper limits are included, including all intermediate ranges or specific radius values, within this full range or any specifically recited range. The navigation controller 100 further includes a motion-detection controller 80 to measure pitch corresponding to a tilt of the seating portion 10. The motion-detection controller 80 is shown mounted on the seat 15 but may be mounted elsewhere (e.g., on the back-rest 20).

Figure 2:
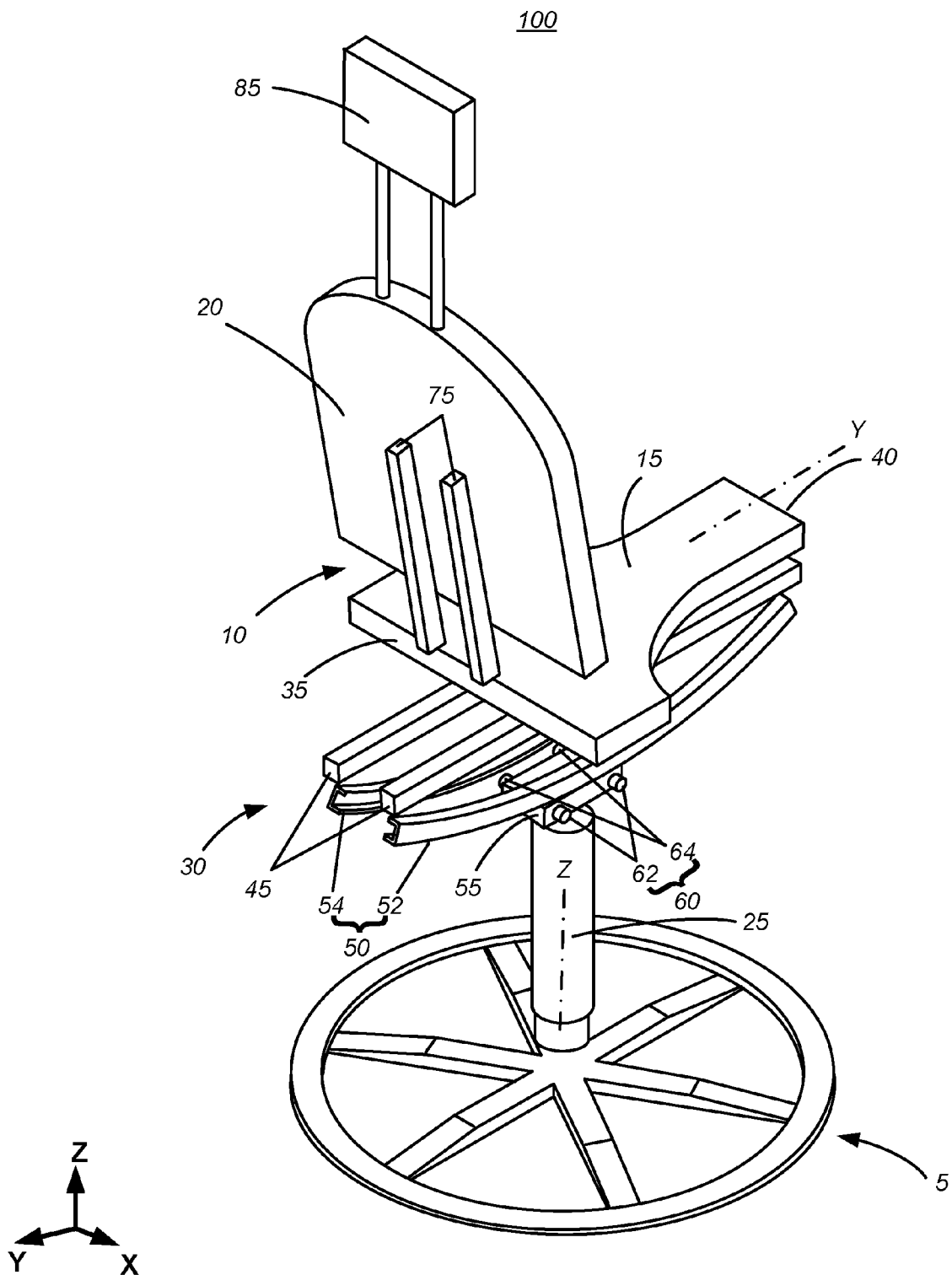
FIGS. 2 and 3 illustrate partially exploded back perspective views of the virtual-reality navigation controller in accordance with some embodiments.
Figure 3:
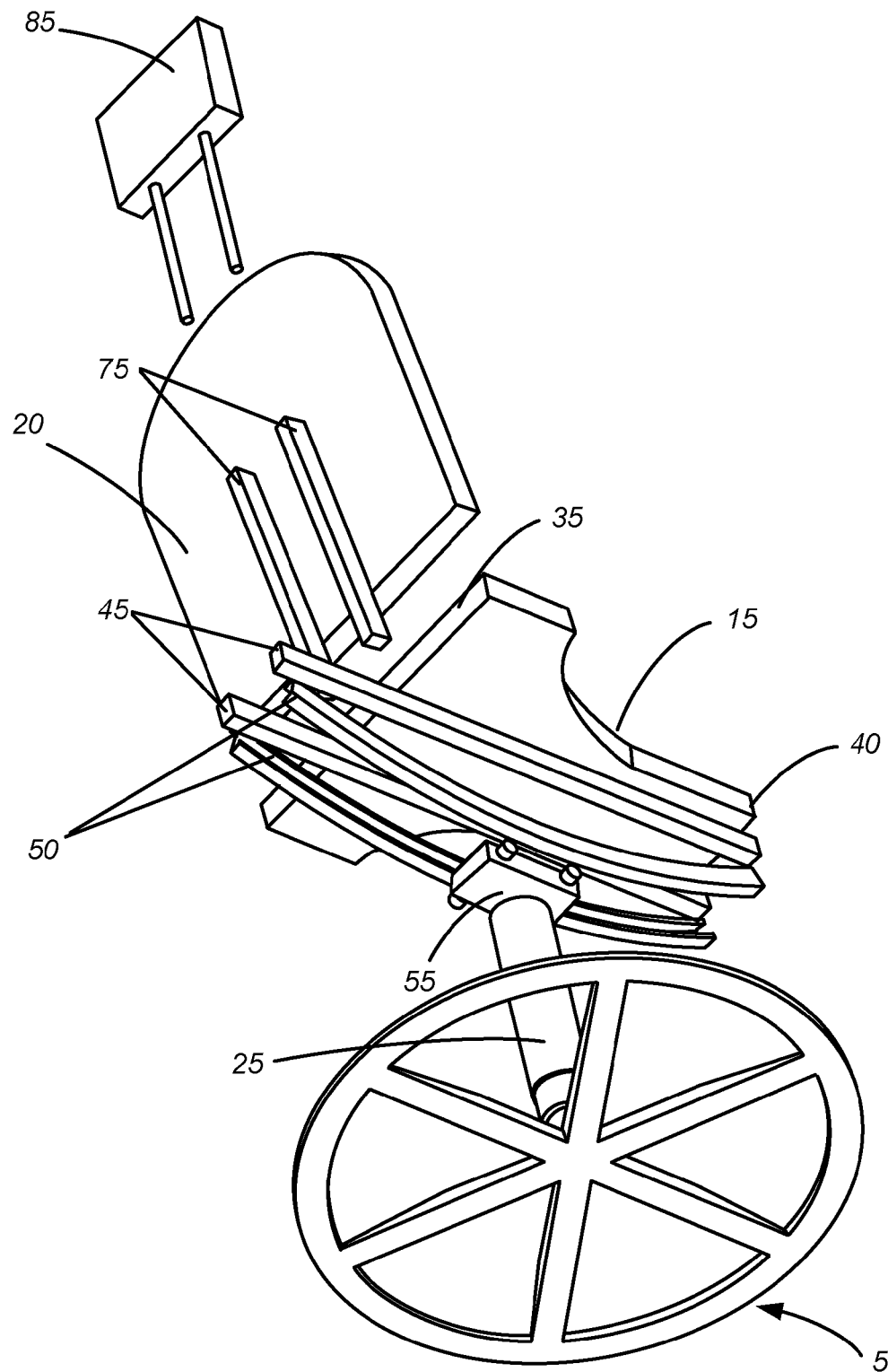

FIGS. 2 and 3 illustrate exploded back views of the virtual-reality navigation controller 100 in accordance with some embodiments. In some embodiments, the seat 15 extends lengthwise along a horizontal axis (e.g., a center axis Y) from a proximal end 35 to a distal end 40. At least a portion of a length of the seat 15 on both left and right sides is concavely curved toward the center axis Y along the length of the seat to narrow the seat toward the distal end 40 and to better accommodate legs of the user during yaw, tilt, and/or vertical chair movements. This configuration of the seat 15 provides adequate support for the user seated thereon while minimally restricting movement of the user's legs as compared with a general seat design. The seat 15 configuration thus provides the advantage that the user is able to push back or pull forward in the seat 15 using feet firmly placed on the ground without his/her legs abutting against or being interfered with by edges of the distal end 40 of the seat 15 during virtual-reality activities.

In some embodiments, the back-rest 20 supporting the user's back is coupled at its lower end to the proximal end 35 of the seat through at least one reinforcement bar 75. The reinforcement bar 75 lends structural integrity to the back-rest, and reinforces the coupling between the back-rest 20 and the seat 15. In some embodiments, the back-rest 20 may be hingedly connected, at a lower end thereof, to the proximal end 35 of the seat 15 in order to rotate and/or tilt integrally with the seat 15. For example, the back-rest 20 may be coupled to the seat 15 at varying off-perpendicular angles to allow the user to adjust the angle at which the back-rest 20 is coupled to the seat 15 for comfort.

In some embodiments, the motion-detection controller 80 is configured to measure pitch corresponding to the tilt of the seating portion 10 (e.g., with respect to the vertical support 25). The motion-detection controller 80 may be integrated with motion sensors (not shown) which measure a degree of tilting of the seating portion 10. Alternatively, the motion sensors may be separate from the motion-detection controller 80, and may be positioned, for example on the seating portion 10.

Alternatively, the motion sensors may be distal, video-based sensors located on the floor or desktop in the proximity of the chair. Tilting of the seating portion 10 may be initiated by the user either pushing backwards or pulling forward with feet firmly placed on the ground. This way a user is able to control a degree of tilting of the seating portion 10 to achieve a desired backwards or forward movement to correspond to an acceleration or deceleration in virtual-reality. To achieve this effect, the motion-detection controller 80 is communicatively coupleable to a virtual-reality device (e.g., a virtual-reality headset or head mounted display (HMD)) to initiate corresponding tilting motions in virtual-reality. The motion detection controller 80 is configured such that it is able to detect, through the sensors, the degree of tilt (e.g. the angle of tilt) corresponding to a vertical and a horizontal displacement of the seating portion 10 in reality, and to communicate the data corresponding to the tilt to the virtual-reality device so that the user's avatar in virtual-reality may be subjected to a motion (e.g. acceleration or deceleration) matching the degree of tilt in reality. Because the user is subjected to a physical motion in reality which matches a motion in the virtual-reality, the user's vestibular and muscle senses are stimulated synchronously with visual sense, thereby reducing or eliminating altogether simulator (motion) sickness.

In some embodiments, the seating portion 10 is rotatably coupled to the vertical support 25 to be rotatable about a vertical axis Z of the vertical support 25, and the motion-detection controller 80 is configured to measure yaw corresponding to rotation of the seating portion 10 about the vertical axis Z and communicate the degree of the rotation to the virtual-reality device (e.g., the HMD) to initiate corresponding rotation in virtual-reality. The motion detection controller 80 is able to detect the degree of rotation of the seating portion 10 in reality, and to communicate the measurements corresponding to the rotation to the virtual-reality device so that the user's avatar in virtual-reality may be subjected to a motion (e.g. turns) matching the degree of rotation in reality. Because vestibular, muscle and skin sensation experienced by the user during rotation in the seating portion match the experienced visual stimulation in the virtual-reality, the user is able to maintain vestibular balance, thereby minimizing or eliminating altogether simulator (motion) sickness.

In some embodiments, the rotatable connector 30 includes a first pair of parallel rails 45 coupled to the seating portion 10 and a second pair of parallel rails 50 coupled to the first pair of parallel rails 45. Each rail 52 and 54 of the second pair of parallel rails 50 has a C-shaped curved profile. In some embodiments, each rail of the first pair of parallel rails 45 is straight. The rotatable connector 30 further includes a roller portion 55 including a plurality of rollers 60 rollably disposed along the curved profile of each rail of the second pair of rails 50. The roller portion 55 may be coupled to the vertical support 25. The rollers 60 slide within an inner portion of the C-shape profile of the corresponding rail 52 and 54 of the second pair of parallel rails 50. The C-shape is to guide the rollers along the profile of the second pair of parallel rails 50 so as to tilt the seating portion 10 at desired angles.

In some embodiments, rails 45, 52 and 54 of the first and second pairs of parallel rails 45 and 50 can be formed of one or more metals including but not limited to iron, copper, steel, aluminum, rubber, tin, or any similar materials.

Alternatively, the rails of the first and second pairs of parallel rails may be made of a hard plastic or similar durable material. In other embodiments, the rails of the first and second pairs of parallel rails may be made of other materials including, but not limited to wood, glass, plexiglass, fiberglass and the like, all of which may be reinforced in order to increase durability.

In some embodiments, the first pair of parallel rails 45 is integrally formed with the seat 15. Alternatively, the first pair of parallel rails 45 may be coupled in a fixed manner to the seat 15 by a threaded screw, bolt, rivet or any similar fastener inserted through a similarly threaded hole on the seat 15 and locked in place. The first pair of parallel rails 45 may also be coupled in a fixed manner to the seat 15 by an adhesive, an ultrasonic weld or any similar plastic or metal fusion/welding process. In some embodiments, the seat 15 and the first pair of parallel rails 45 may also be removably coupled in an adjustable manner by a magnet.

Figure 5:
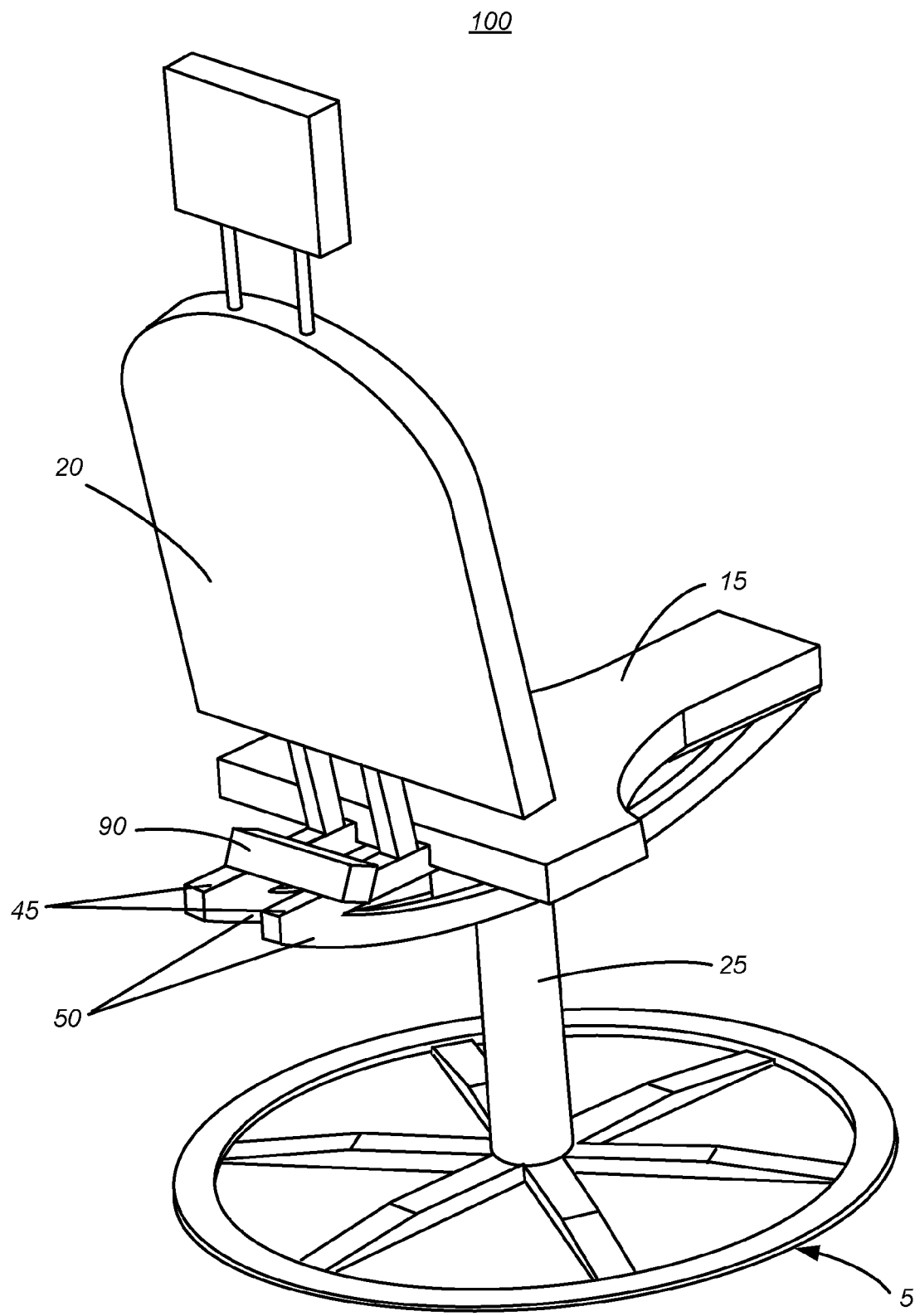
FIG. 5 illustrates a back perspective view of the virtual-reality navigation controller in accordance with some embodiments.

In some embodiments, as illustrated in FIG. 5, the first pair of parallel rails 45 is integrally formed with the second pair of parallel rails 50. Alternatively, the second pair of parallel rails 50 may be coupled in a fixed manner to the first pair of parallel rails 45 by a threaded screw, bolt, rivet or any similar fastener inserted through a similarly threaded hole on the first pair of parallel rails and locked in place. Alternatively, the second pair of parallel rails 50 may also be coupled in a fixed manner to the first pair of parallel rails 45 by an adhesive, an ultrasonic weld or any similar plastic or metal fusion/welding process. In some embodiments, the first and second pairs of parallel rails 45 and 50 may also be removably coupled in an adjustable manner by a magnet (not shown).

In some embodiments, the second pair of parallel rails 50 is slidably engaged with the roller portion 55 through the plurality of rollers 60. The plurality of rollers 60 is secured within the C-shaped curved profiles of the second pair of parallel rails 50 to slidably roll and thereby tilt the seating portion 10 along the circumferences of the second pair of parallel rails 50. The plurality of rollers 60 includes a first pair of rollers 62 slidably engaged in a first rail 52 of the second pair of parallel rails 50 and a second pair of rollers 64 slidably engaged in a second rail 54 of the second pair of parallel rails 50. When the user engages in a virtual-reality activity which involves accelerating forward (e.g. driving a race car and pressing on an accelerator pedal), the user may initiate a corresponding forward acceleration in real life by firmly placing feet on the floor and exerting a forward pulling force on the seating portion 10 while seated in the seat 15.

As a result, the first and second pair of rollers 62 and 64 will roll forward in the corresponding first and second rails 52 and 54 of the second pair of parallel rails 50, thereby pitching the seating portion 10 backwards, simulating a pulling force and creating a real-life physical feeling of a pulling gravity shift. As the user is pitched backwards in the seating portion 10, the user's eyes view a rapid acceleration in the race car virtual-reality environment, thereby creating an extra immersive and enhanced feeling of reality. Due to the motion of the seating portion caused by the rotatable connector 30, the user experiences proprioceptive (muscle) sensations due to muscle effort of the feet, and somatosensory (skin) sensations accompanying the visually experienced virtual-reality accelerations and decelerations. Because the user's mind is tricked into believing the user physically engaging in the visualized virtual-reality activity, the vestibular (balance) sensation is provided thereby greatly reducing or eliminating altogether simulator sickness.

The present configuration provides the advantage that unlike regular office chairs, which tilt around a swivel joint located underneath the seat, the navigation controller 100 of the various embodiments described herein has the effect of tilting the user about a point located in, or near (e.g., above) the user's head. Tilting about this point is achieved by the seat 15 rocking back and forth as result of the rollers 62 and 64 rolling along the C-shape profile of the respective first and second rails 52 and 54 of the second pair of parallel rails 50 positioned underneath the seating portion 10. Furthermore, because the rotations and tilts are powered by the user's feet pushing and pulling on the floor, no mechanical actuators are involved, thereby reducing manufacturing costs.

Figure 4:
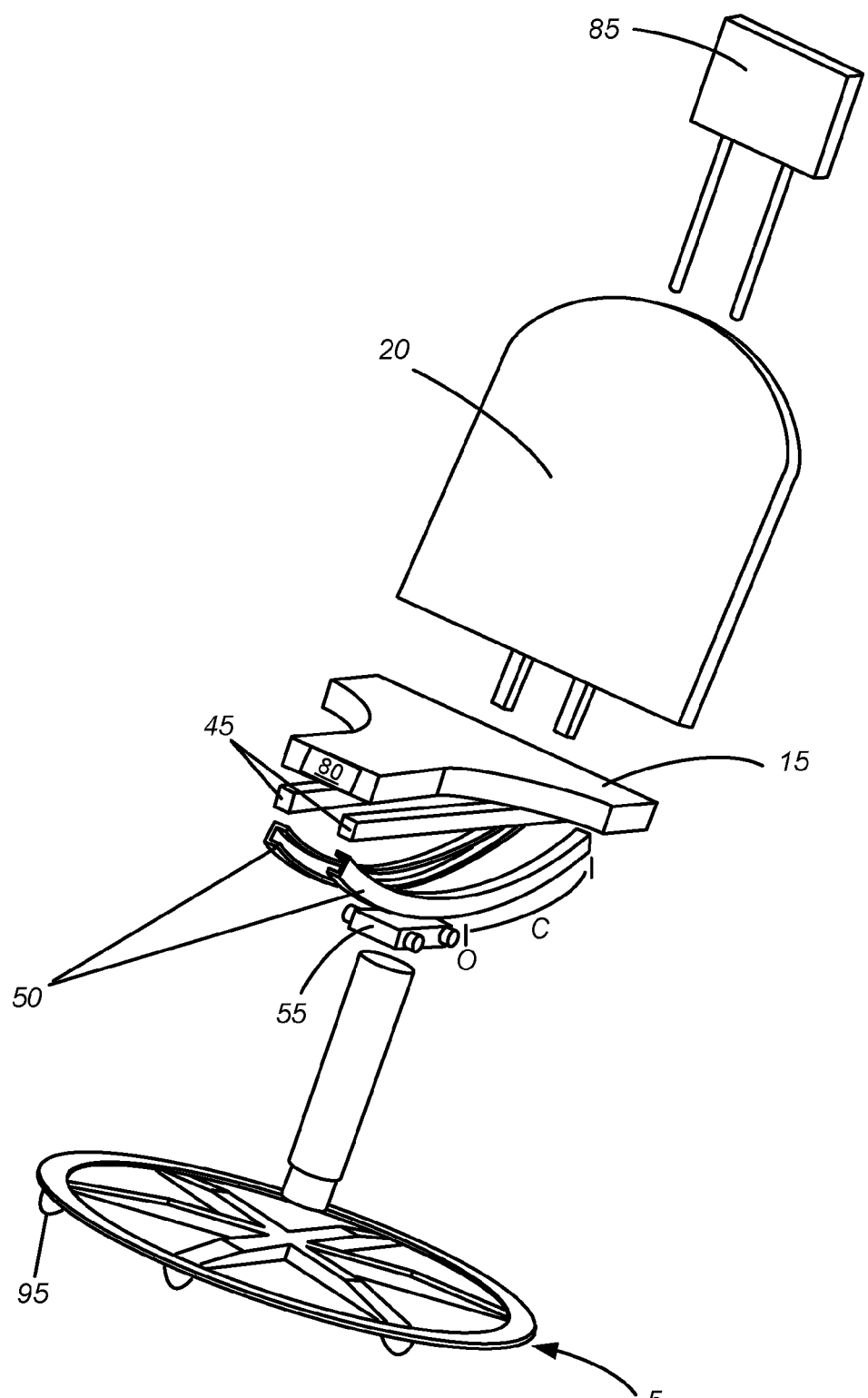
FIG. 4 illustrates an exploded front perspective view of the virtual-reality navigation controller in accordance with some embodiments.

FIG. 4 illustrates an exploded front perspective view of the virtual-reality navigation controller 100 in accordance with some embodiments. In some embodiments, a radius of an upward arc C of each of the first and second rails 52 and 54 of the second pair of parallel rails 50 typically ranges from 500-800 mm to prevent counter-phase movement of the user's head in relation to the movement of the seating portion 10. For example, the radius of the upward arc of each of the first and second rails 52 and 54 ranges from 600-750 mm, 650-725 mm, or in some cases approximately 700 mm. By approximately, it is intended that the radius of the upwards arc be within 2% of 700 mm. Though recited in terms of certain ranges, it will be understood that all ranges from the lowest of the lower limits to the highest of the upper limits are included, including all intermediate ranges or specific radius values, within this full range or any specifically recited range. The aforementioned configuration provides the advantage of preventing an undesirable vestibular signal counter to the simulated motion (e.g. acceleration, or deceleration) in virtual-reality. In some embodiments, prevention of the undesirable vestibular (balance) signal is achieved by providing the radius of the upwards arc of each of the rails 52 and 54 at a measurement equaling the distance between the seat 15 and head center of an average-height seated user.

In some embodiments, as illustrated in FIG. 1, the motion-detection controller 80 is coupled to the seating portion 10. Given this configuration, the motion detection controller 80 is able to detect displacement of the seating portion 10 with respect to the tilting and/or the rotation of the rotatable connector 30 and to communicate the degree of the tilting and the rotation to the virtual-reality device (e.g. the HMD). Communication of the degree of tilting and the rotation of the seating portion to the virtual-reality device facilitates matching of the vestibular (balance), proprioceptive (muscle), and somatosensory (skin) sensations experienced by the user seated in the seating portion 10 during the tilting (i.e. acceleration or deceleration) or the rotation (i.e., turning) to the visual stimulation provided by the virtual-reality device.

In some embodiments, each rail 52 and 54 of the second pair of parallel rails 50 includes a dip 70 at a bottom portion of the C-shape curved profile. When the seat 15 of the seating portion 10 is in a neutral, non-tilted position, for example, (as illustrated in FIG. 1) before the user exerts any force to displace and tilt the seating portion 10, respective rollers of the plurality of rollers 60 are disposed in a resting position in the dips 70. In some embodiments, each dip 70 is a shallow dip so as to allow a smooth movement of the respective rollers 60 into and out of the shallow dips 70.

In some embodiments, the respective rollers of the plurality of rollers 60 are configured to be shifted out of the dips 70 from the resting position to a tilting position when the user exerts at least one of a backward pushing force or a forward pulling force on the seating portion. Accordingly, the plurality of rollers 60 is configured to be returned to the resting position naturally by a weight of the user sitting in the seating portion 10 when the user ceases to apply the at least one of the pushing or pulling force. The backward pushing force may be a force exerted by the user pushing backwards with feet resting on the floor while sitting in the seating portion 10, and the forward pulling force may be a force exerted by the user pulling forward with feet resting on the floor while sitting in the seating portion 10.

When the user engages in the virtual-reality activity which involves accelerating forward (e.g. driving a race car and pressing on an accelerator pedal), the user initiates the corresponding forward acceleration by firmly placing feet on the floor and exerting the forward pulling force on the seat while seated in the seating portion 10. As a result of the forward pulling force, the respective rollers of the plurality of rollers 60 are shifted out of the dips 70 from the resting position and roll forward in the corresponding first and second rails 52 and 54 of the second pair of parallel rails 50, thereby pitching the seating portion 10 backwards, simulating the pulling force and creating the real-life physical feeling of the pulling gravity shift. As described above, as the user is pitched backwards in the seating portion 10, the user's eyes view a rapid acceleration in the race car virtual-reality environment matching the backwards motion, thereby creating an extra immersive and enhanced feeling of reality without the accompanying simulator sickness.

When engaged in the virtual-reality activity (e.g. driving the race car), the user may wish to brake (e.g., decelerate the vehicle). Deceleration of the vehicle may be achieved by the user firmly placing feet on the floor and exerting the backward pushing force on the seat while seated in the seating portion 10. As a result of the backward pushing force, the respective rollers of the plurality of rollers 60 roll backward in the corresponding first and second rails 52 and 54 of the second pair of parallel rails 50, thereby pitching the seating portion 10 forward, and creating the real-life physical feeling of deceleration or braking in the race car virtual-reality environment to provide an extra immersive and enhanced feeling of reality.

The neutral tilt position (e.g. no forward or backward acceleration) will be achieved when the respective rollers 60 come to rest in the dips 70 along the bottom portion of the corresponding first and second rails 52 and 54. The user thus is able to change the degree of seat tilt with respect to the resting position and initiate acceleration in virtual-reality by pushing away or pulling in with feet resting on the floor. The user's weight will provide a natural incentive for the seating portion 10 to return to the rest position as soon as the user terminates the backward pushing force or the forward pulling force.

FIG. 5 illustrates an exploded back perspective view of the virtual-reality navigation controller 100 in accordance with some embodiments. As illustrated in FIG. 5, the virtual-reality navigation controller 100 further includes a counter-balance weight 90 configured to facilitate tilting of the seating portion 10 backward by exerting a downward force on a back portion of the first and second pairs of parallel rails 45 and 50. The weight 90 additionally provides the advantage of adding a force to propel the user forward during forward tilting (e.g., deceleration or braking), thereby requiring less force to be exerted by the user in pulling forward during the forward tilt. This is helpful because leg muscles pulling forward are considerably weaker than leg muscles pushing back. The weight 90 may be coupled to the rotatable connector at a position behind the seating portion 10 in order to provide optimal leverage. In some embodiments, the weight 90 weighs between 20 and 30 pounds.

In some embodiments, a maximum tilting displacement due to at least one of a backward tilt and a forward tilt of the seating portion based on a circumference of each rail 52 and 54 of the second pair of parallel rails measured from a center O of the bottom portion of each rail in the corresponding backwards or forward direction ranges from 200-400 mm, for example from 225-375 mm, 250-350 mm, 275-325 mm, or in some cases approximately 300 mm. By approximately, it is intended that the radius of the upwards arc be within 2% of 300 mm. Though recited in terms of certain ranges, it will be understood that all ranges from the lowest of the lower limits to the highest of the upper limits are included, including all intermediate ranges or specific values, within this full range or any specifically recited range. In some embodiments, the maximum tilting angle due to at least one of the backward tilt and the forward tilt of the seating portion 10 based on the circumference of each rail 52 and 54 of the second pair of parallel rails 50 measured from the center O of the bottom portion of each rail in the corresponding backwards or forward direction is approximately 25 degrees.

In some embodiments the maximum tilting angle corresponds to a maximum tilting angle ranging from 20-30 degrees, for example 22-28 degrees, or 24-26 degrees, or approximately 25 degrees. Though recited in terms of certain ranges, it will be understood that all ranges from the lowest of the lower limits to the highest of the upper limits are included, including all intermediate ranges or specific values, within this full range or any specifically recited range. The aforementioned maximum tilting angle of approximately 25 degrees will create a gravity pull on vestibular sensors in a middle of the user's ear equivalent to 4.5 m/s$^2$ linear acceleration. In this sense, the maximum tilting angle of the backward tilt will be sufficient to accurately simulate an acceleration of an avatar of the user from 0 to 30 mph in 3 seconds in virtual-reality, which corresponds to typical car acceleration from a complete stop. The aforementioned configuration thus provides the advantage of giving the user a more realistic feel of acceleration and deceleration by stimulating somatosensory (skin) senses in accordance with the simulated forward acceleration, and stimulating proprioceptive (muscle) senses in accordance with the simulated forward acceleration due to the force and muscle effort of the legs required to tilt the seating portion 10 forward and backward. Since the physical motion experienced by the user corresponds to the visual motion observed, the potential for the user to experience simulator sickness is greatly diminished or eliminated altogether.

In some embodiments, the virtual-reality navigation controller 100 further comprises a head-rest 85, coupled to the back-rest 20 and configured to support a head of the user seated in the seating portion 10. The rotatable connector 30 is configured to tilt the seating portion 10 about an axis of the head-rest 85 at a point located in or near (e.g., above) the user's head when the user is seated on the seat. In some embodiments, as illustrated in FIG. 4, the motion-detection controller 80 including motion sensors (not shown) is coupled to the head-rest 85. As described above, tilting about the point located near the user's head is achieved by the seat 15 rocking back and forth as a result of the rollers 60 rolling along the C-shape profile of the first and second rails 52 and 54 of the second pair of parallel rails 50 positioned underneath the seating portion 10.

Contrary to conventional tilting chairs which are generally configured to tilt about a swivel joint located underneath the seat, the seating portion 10 is configured to tilt at the point located in or near the user's head (e.g., about the axis of the head-rest 85), thereby allowing the motion detection controller 80 to more accurately measure and communicate the actual tilt and roll of the user's head to the virtual-reality device for a more precise matching visual stimulation to reduce lack of vestibular (balance) sensation and the accompanying simulator sickness.

In some embodiments, the base 5 includes wheels 95 which are provided in a locked configuration during tilting and rolling of the seating portion 10 and provided in a freely rotatable configuration when the seating portion 10 is locked into a desired configuration for use as a chair during non-virtual-reality activities. The rotatable connector 30 is configured to lock the seating portion 10 into a desired tilted configuration for use as a chair during the non-virtual-reality activities. In this sense, the virtual-reality navigation controller 100 may additionally be used for other purposes (e.g., as an office chair) when the user is not using it for virtual-reality activities. For example, a tilt lock mechanism may be provided to lock the seating portion 10 in forward, middle, and reclined tilt positions for user comfort. This can be accomplished by locking the seat 15 and back-rest 85 in the desired tilt position which also prevents movement of the seating portion 10.

Figure 6:
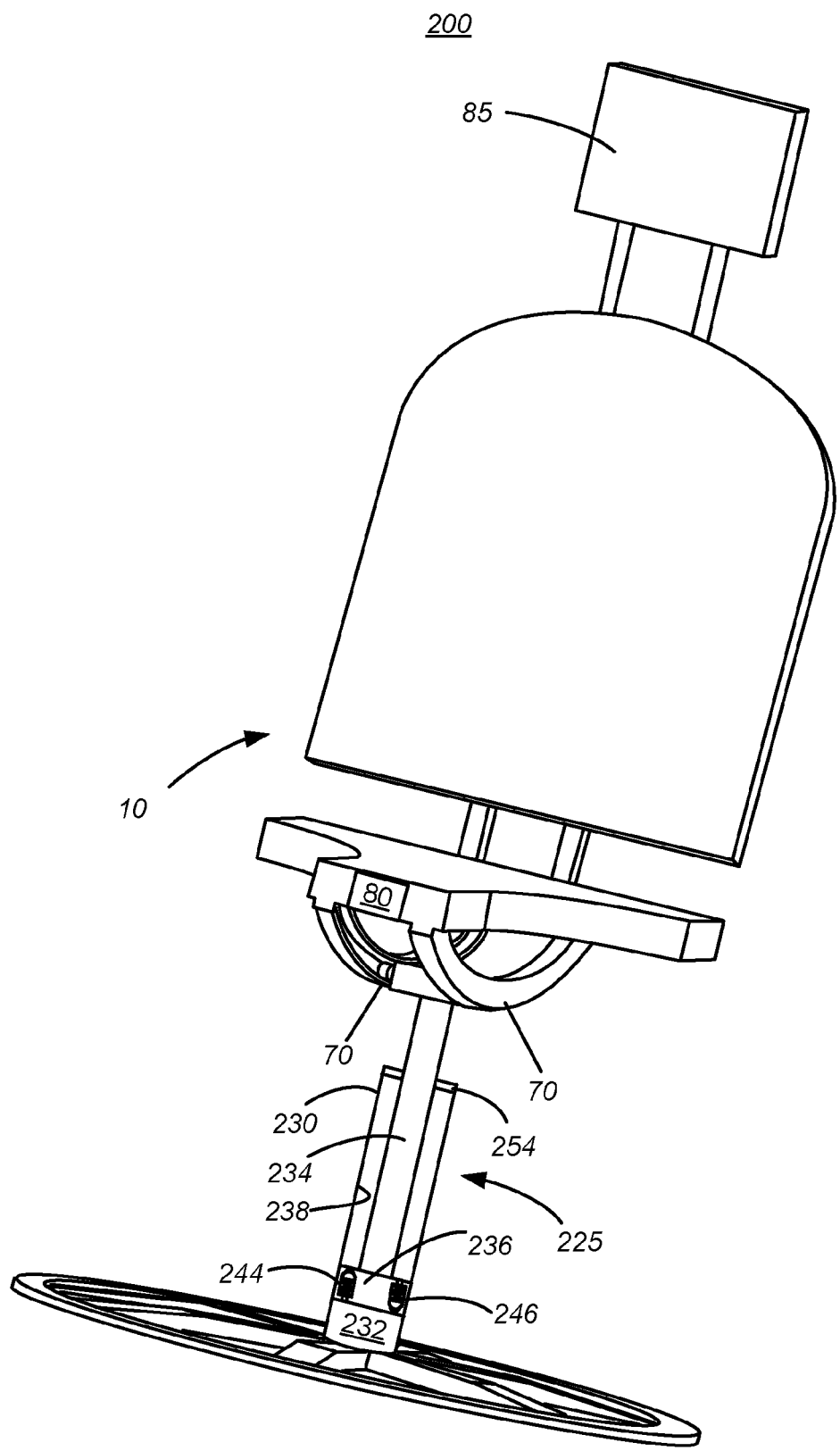
FIG. 6 illustrates a front perspective view of a virtual-reality navigation controller in accordance with some embodiments.

FIG. 6 illustrates a front perspective view of a virtual-reality navigation controller 200 in accordance with some embodiments. The virtual-reality navigation controller 200 of FIG. 6 is an example of the virtual-reality navigation controller of FIGS. 1-5. In some embodiments, the virtual-reality navigation controller 200 includes a base 5, and a seating portion 10. The seating portion 10 includes a seat 15 for supporting a weight of a user seated thereon and a back-rest 20 coupled to the seat to move integrally with the seat 15 and to support the user's back. The virtual-reality navigation controller 200 further includes a displacement connector 225 between the seating portion 10 and the base 5 to reciprocate the seating portion 10 upwards and downwards, and a motion-detection controller 80 to measure upwards and downwards displacement of the seating portion 10. The displacement connector 225, which is an example of the vertical support 25, is configured to move the seating portion 10 upwards along with the user to support the user when the user ascends from the seat 15 during virtual-reality activities. The displacement connector 225 is further configured to move the seating portion 10 downwards at a slower maximum speed than the upwards movement, when the user's body rests back on the seat 15. The virtual-reality navigation controller 200 may additionally include the rotatable connector 30 as described above. In these embodiments, the roller portion 55 of the rotatable connector 30 may be coupled to the displacement connector 225 instead of the vertical support 25.

In some embodiments, the displacement connector 225 includes a cylindrical housing 230 sealably containing a compressible fluid 232 therein, a piston rod 234 reciprocally disposed in the housing 230, and a piston 236 mounted on the piston rod 234 and disposed to reciprocate upwards and downwards along inner walls 238 of the housing 230. The piston 236 is configured to guide the piston rod 234 to keep it centered in the cylindrical housing 230. The displacement connector 225 may further include at least one check-valve 244, 246. The at least one check-valve 244, 246 is configured to increase an amount of flow of the compressible fluid 232 past the piston 236 in a first direction to accelerate the piston rod 234 and the seating portion 10 upwards. The at least one check-valve 244, 246 is further configured to restrict the amount of flow of the compressible fluid 232 past the piston 236 in a second direction to decelerate the piston rod 234 and the seating portion 10 downwards.

In some embodiments, the displacement connector 225 is configured to displace or move the seating portion 10 vertically in the upwards and downwards direction, but the movement is not specifically limited to vertical movement. For example, the displacement connector 225 may move the seating portion 10 upwards or downwards at an angle or at a range of angles offset from vertical. For example, the angle off-vertical will range from about 0-45 degrees off-vertical, or 0-15 degrees off vertical, or in some cases approximately 0 degrees off-vertical (i.e., completely vertical). Though recited in terms of certain ranges, it will be understood that all ranges from the lowest of the lower limits to the highest of the upper limits are included, including all intermediate ranges or specific angles, within this full range or any specifically recited range.

The upwards and downwards, or vertical displacement is achieved as a result of the piston rod 234 with the piston 236 reciprocating upwards thereby pushing the seating portion 10 upwards and as a result of the piston rod 234 moving downwards due to the weight of the user resting back in the seat 15. The displacement connector 225 is configured to have a relatively quick expansion stroke where the piston rod 234 extends and raises the seating portion 10 upwards, and a slower compression stroke where the user rests back in the seating portion 10 and the piston rod 234 retracts downwards and compresses the fluid as a result of the exerted user's weight.

In some embodiments, the aforementioned configuration may be achieved by, but is not limited to, forming the displacement connector as a gas spring. Given this configuration, the displacement connector 225 forms a gas spring-loaded connection, and the compressible fluid 232 may be, but is not limited to, pressurized nitrogen gas. The cylindrical housing 230 sealably contains the pressurized gas 232 so as to prevent the gas 232 from escaping from the housing 230. The pressurized gas 232 allows the displacement connector 225 to store energy, and the piston 236 mounted on the piston rod 236 reciprocates upwards and downwards inside the cylindrical housing while being closely fitted (i.e., with a very tight clearance between the inner walls of the housing 230) so as to minimize gas flowing between the inner walls 238 and the piston 236 as the piston 236 reciprocates within the housing 230.

When the piston rod 234 is disposed in a position where it is extended upwards from the housing 230, and the user rests his or her weight in the seating portion 10, the piston rod 234 and mounted piston 236 are displaced downwards into the cylindrical housing 230 and compress the gas 232. The at least one check-valve 244, 246 may be disposed in the piston 236 to selectively open and close at least one pathway through which at least a portion of the nitrogen gas may flow past the piston, in order to increase the amount of flow of the compressible fluid 232 past the piston 236 in the upward direction (as compared to the downward direction), thereby increasing a maximum speed at which the piston 236 and the seating portion 10 move upwards (as compared to downwards) or to restrict the amount of flow of the compressible fluid past the piston 236 in the downwards direction, thereby decelerating the maximum speed at which the piston 236 and the seating portion 10 move downwards.

When the user ascends from the seating portion 10, thereby releasing at least a portion of weight from the seating portion 10, the pressurized compressed gas pushes against and displaces the piston rod 234 and piston 236 upwards to an extended position. The at least one check-valve 244, 246 opens the at least one pathway to increase the amount of flow of the gas 232 past the piston 236 and accelerate the piston and the seating portion upwards at a relative speed greater than that at which the piston 236 is moved downwards when the user sits in the seating portion 10. The gas 232 inside the cylindrical housing 230 flows through the at least one check-valve and/or around the piston 236 (between the piston 236 and the inner walls 238 of the housing 230) from one side of the piston 236 to the other as the piston 236 reciprocates upwards and downwards. In some embodiments, the piston 236 may include at least one additional pathway to facilitate movement of the compressed gas 232 between opposite sides of the piston 236.

In some embodiments, the displacement connector 225 further includes a lubricant contained in the cylindrical housing to lubricate the piston 236 as the piston 236 reciprocates in the upwards and downwards directions. The lubricant is further configured to decelerate or dampen the movement of the piston 236 at the end of the upwards or downwards stroke so as to make for a smoother upwards and downwards movement. The lubricant may be an oily substance (e.g. oil) to reduce friction as the piston 236 reciprocates in the upwards and downwards directions. The displacement connector 225 may additionally include a seal 254 to contain the compressible fluid 232 (e.g., the nitrogen gas) and the lubricant (e.g., the oil) in the housing 230 and prevent leakage of the gas and oil out of the cylindrical housing 230. The seal 254 may be made of a flexible rubber material, and may be, but is not limited to a washer or an O-ring.

In some embodiments, the at least one check-valve includes first and second check-valves 244 and 246. The first check-valve 244 is disposed in an open condition and the second check-valve 246 is disposed in a closed condition when the piston rod 234 is extended upwards from the housing 230 for the compressible fluid 234 to travel through the first check-valve 244 and allow the piston 234 to move the seating portion 10 upwards at a first speed matching that of the user's ascent. The first check-valve 244 is disposed in a closed condition and the second check-valve 246 is disposed in an open condition when the piston rod 234 retracts into the housing 230 for the compressible fluid 232 to travel through the second check-valve 246 and allow the piston 234 to move the seating portion 10 downwards at a second speed. The first check-valve 244 may have a larger flow cross-section area than the second check-valve 246, thereby allowing a greater amount of fluid to flow past the piston 236 when the piston rod 234 and piston 236 extend upwards compared to the amount of fluid flowing past the piston 236 when the piston rod 234 and piston 236 retract downwards. Therefore, a maximum value of the first speed is greater than a maximum value of the second speed.

When the piston rod 234 is disposed in the position where it is retracted into the housing 230 in a state in which the pressurized gas is compressed, and the user ascends from the seating portion 10, thereby releasing at least a portion of weight from the seating portion 10, the pressurized compressed gas pushes against and displaces the piston rod 234 and piston 236 upwards and the first check-valve 244 opens the at least one pathway to increase the amount of flow of the gas past the piston 236 in the upwards direction and accelerate the piston rod 234 and the seating portion 10 upwards at a speed matching the user's ascent. When the piston rod 234 is disposed in a position where it is extended upwards from the housing 230, and the user rests his or her weight in the seating portion 10, the piston rod 234 and mounted piston 236 are displaced downwards into the cylindrical housing 230 and compress the gas 232 at a slower speed than the extension.

Even though the second check-valve 246 is disposed in the closed position during the extension, the difference in flow cross-section area between the first and second check-valves 244 and 246 causes the piston 236 to move faster in the upwards direction than in the downwards direction. Thus, the displacement connector 225 achieves quick extension of the piston rod 234 and seating portion 10 coupled thereto allowing the user to stay supported in the seating portion 10 during a quick ascent (e.g. jumping) and achieves slow compression when the user rests back in the seating portion. Once the user's body comes to rest in the seat, the user's weight will lower the seat back into the resting position while simultaneously compressing the gas 232, preparing the seating portion for the next simulated jump in approximately 10 seconds. Given the aforementioned configuration, the displacement connector 225 is able to simulate active upwards accelerations to generally visually match the experienced virtual-reality accelerations, thereby providing the necessary vestibular (balance) sensation to reduce the potential for simulator sickness during the virtual-reality activities. This is especially important for abrupt accelerations experienced in jumps, where the brain is less likely to expect precise agreement between senses. In addition to vestibular stimulation, muscle and skin senses will be stimulated in agreement with the simulated jump or upwards acceleration.

In some embodiments, the first check-valve 244 may be a flap valve so as to open at more easily (e.g., at a lower pressure) to facilitate greater flow movement through the first check-valve 244 and accelerate the piston 236 at a greater speed in the upward direction. In some embodiments, the at least one check-valve 244, 246 may be a ball check-valve or a disc check-valve. The at least one check-valve 244, 246 may be spring-loaded to keep the check-valve in a closed position.

In some embodiments, the motion-detection controller 80 is communicatively coupleable to a virtual-reality device to initiate corresponding upwards and downwards motions in virtual-reality. As similarly described above, the motion-detection controller 80 is communicatively coupleable to the virtual-reality device (e.g., a virtual-reality headset or head-mounted display) to initiate corresponding upwards and downwards motions in virtual-reality. The motion detection controller 80 is configured such that it is able to detect, through the sensors, the degree upwards or downwards displacement of the seating portion 10 in reality, and to communicate the measurements corresponding to the displacement to the virtual-reality device so that the user's avatar in virtual-reality may be subjected to a motion (e.g. upwards acceleration or jump) matching the degree of upwards or vertical displacement in reality. Because the user is subjected to a physical motion in reality which matches a motion in the virtual-reality, the user's vestibular and muscle senses are stimulated synchronously with visual sense, thereby reducing or eliminating altogether simulator sickness.

In some embodiments, as described above, the motion-detection controller 80 may be coupled to the seating portion 10. The seating portion may be rotatably coupled to the displacement connector to be rotatable about a vertical axis of the displacement connector. Similarly, as described above with respect to the vertical support 25, the motion-detection controller 80 may be configured to measure yaw rotation of the seating portion 10 about the vertical axis of the displacement connector 225 and communicate the yaw rotation to the virtual-reality device to initiate corresponding rotation in virtual-reality. In some embodiments, the motion-detection controller 80 is also configured to measure tilt (i.e., pitch) and communicate the tilt to the virtual-reality device to initiate corresponding acceleration or deceleration in virtual-reality.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A virtual-reality navigation controller, comprising:
   a base;
   a seating portion, including:
      a seat for supporting a weight of a user seated thereon, and
      a back-rest coupled to the seat to move integrally with the seat and to support the user's back;
   a vertical support to support the seating portion on the base;
   a rotatable connector between the seating portion and the vertical support to tilt the seating portion about a rotational center of the rotatable connector in response to directional forces exerted by the user when seated on the seat,
   wherein a radius of an arc formed by the tilting about the rotational center ranges from 300 mm to 800 mm; and
   a motion-detection controller to measure pitch corresponding to the tilt of the seating portion resulting from the directional forces.

2. The virtual-reality navigation controller of claim 1, wherein the seat extends lengthwise along a horizontal axis from a proximal end to a distal end, at least a portion of a length of the seat on both left and right sides being concavely curved toward a center axis along the length of the seat to narrow the seat toward the distal end and to accommodate legs of the user during chair movements.

3. The virtual-reality navigation controller of claim 1, wherein the motion-detection controller is communicatively coupleable to a virtual-reality device to initiate corresponding tilting motions in virtual reality.

4. The virtual-reality navigation controller of claim 1, wherein the motion-detection controller is to measure yaw corresponding to rotation of the seating portion about a vertical axis of the vertical support.

5. The virtual-reality navigation controller of claim 1, wherein the rotatable connector comprises:
   a first pair of parallel rails coupled to the seating portion;
   a second pair of parallel rails coupled to the first pair of parallel rails, each rail of the second pair of parallel rails having a C-shaped curved profile; and
   a roller portion including a plurality of rollers rollably disposed along the curved profile of each rail of the second pair of rails, the roller portion being coupled to the vertical support.

6. The virtual-reality navigation controller of claim 5, wherein:
   the second pair of parallel rails is slidably engaged with the plurality of rollers; and
   the plurality of rollers is secured within the second pair of parallel rails to slidably tilt the seating portion along the circumferences of the second pair of parallel rails.

7. The virtual-reality navigation controller of claim 5, wherein the plurality of rollers comprises a first pair of rollers slidably engaged in a first rail of the second pair of parallel rails and a second pair of rollers slidably engaged in a second rail of the second pair of parallel rails.

8. The virtual-reality navigation controller of claim 5, wherein a radius of an upward arc of each rail of the second pair of parallel rails is approximately 700 mm to prevent counter-phase movement of the user's head in relation to the movement of the seating portion.

9. The virtual-reality navigation controller of claim 5, wherein:
   each rail of the second pair of parallel rails comprises a dip at a bottom portion of the C-shape curved profile; and in a non-tilted position of the seating portion, respective rollers of the plurality of rollers are disposed in a resting position in the dips.

10. The virtual-reality navigation controller of claim 9, wherein:
    the directional forces exerted by the user include a backward pushing force and a forward pulling force on the seating portion;
    the respective rollers are configured to be shifted out of the dips from the resting position to a tilting position when the user exerts at least one of the backward pushing force or the forward pulling force on the seating portion; and
    the plurality of rollers is configured to be returned to the resting position naturally by a weight of the user sitting on the seating portion when the user ceases to apply the at least one of the pushing or pulling force.

11. The virtual-reality navigation controller of claim 10, wherein:
    the backward pushing force comprises a force exerted by the user pushing backwards with feet resting on the floor while sitting in the seating portion; and
    the forward pulling force comprises a force exerted by the user pulling forward with feet resting on the floor while sitting in the seating portion.

12. The virtual-reality navigation controller of claim 11, wherein a maximum tilting displacement due to at least one of a backward tilt and a forward tilt of the seating portion based on a circumference of each rail of the second pair of parallel rails measured from a center of the bottom portion of each rail of the second pair of parallel rails in the corresponding backwards or forward direction is approximately 300 mm.

13. The virtual-reality navigation controller of claim 5, further comprising a counterbalance weight to facilitate tilting of the seating portion backward by exerting a downward force on a back portion of the first and second pairs of parallel rails.

14. The virtual-reality navigation controller of claim 1, wherein the radius of the arc formed by the tilting about the rotational center of the rotatable connector ranges from 500 mm to 700 mm.

15. The virtual-reality navigation controller of claim 1, wherein:
    the seating portion is rotatably coupled to the vertical support to be rotatable about a vertical axis of the vertical support; and
    the motion-detection controller is configured to measure a degree of the rotation and communicate the degree of the rotation to a virtual-reality device to initiate corresponding rotation in virtual-reality.

16. The virtual-reality navigation controller of claim 1, wherein the motion-detection controller is coupled to the seating portion.

17. The virtual-reality navigation controller of claim 1, further comprising a head-rest configured to support a head of the user seated in the seating portion and coupled to the back-rest,
    wherein the rotatable connector is configured to tilt the seating portion about an axis of the head-rest at a point located near the user's head when the user is seated on the seat, and
    wherein the motion-detection controller is coupled to the head-rest.

18. The virtual-reality navigation controller of claim 1, wherein:
    the base comprises wheels which are configurable to be locked during tilting of the seating portion and freely rotatable when the seating portion is configured for use as a chair during non-virtual-reality activities; and
    the rotatable connector is configured to lock the seating portion into a desired configuration for use as a chair during the non-virtual-reality activities.

19. A virtual-reality navigation controller, comprising:
    a base;
    a seating portion, including:
        a seat for supporting a weight of a user seated thereon, and
        a back-rest coupled to the seat to move integrally with the seat and to support the user's back;
    a vertical support to support the seating portion on the base;
    a rotatable connector, comprising:
        a first pair of parallel rails coupled to the seating portion;
        a second pair of parallel rails coupled to the first pair of parallel rails, each rail of the second pair of parallel rails having a C-shape curved profile; and
        a plurality of rollers rollably disposed along the curved profile of each rail of the second pair of rails,
        wherein the rotatable connector is configured to tilt the seating portion about a rotational center of the rotatable connector when the user is seated on the seat, and
        wherein a radius of an upward arc of each rail of the second pair of parallel rails based on the rotational center ranges from 300 mm to 800 mm, to prevent counter-phase movement of the user's head in relation to the movement of the seating portion; and
    a motion-detection controller to measure yaw corresponding to rotation of the seating portion about a vertical axis of the vertical support and to measure pitch corresponding to the tilt of the seating portion.

20. The virtual-reality navigation controller of claim 19, wherein:
    the second pair of parallel rails is slidably engaged with the plurality of rollers;
    the plurality of rollers is secured within the second pair of parallel rails to slidably tilt the seating portion along the circumference of the second pair of parallel rails;
    each rail of the second pair of parallel rails comprises a dip at a bottom portion of the C-shape curved profile; and
    in a non-tilted position of the seating portion, respective rollers of the plurality of rollers are disposed in a resting position in the dips.

* * * * *